United States Patent
Jones et al.

(10) Patent No.: US 11,012,731 B2
(45) Date of Patent: May 18, 2021

(54) ADAPTIVE BITRATE STREAMING OF LIVE CONTENT WITH MANIFEST UPDATE PUSH NOTIFICATION OR LONG POLL

(71) Applicant: Telefonaktiebolaget LM Ericsson (publ), Stockholm (SE)

(72) Inventors: Anthony Richard Jones, Southampton (GB); Chris Phillips, Hartwell, GA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/324,590

(22) PCT Filed: Jul. 26, 2017

(86) PCT No.: PCT/EP2017/068866
§ 371 (c)(1),
(2) Date: Feb. 11, 2019

(87) PCT Pub. No.: WO2018/028985
PCT Pub. Date: Feb. 15, 2018

(65) Prior Publication Data
US 2019/0222879 A1 Jul. 18, 2019

Related U.S. Application Data

(60) Provisional application No. 62/373,536, filed on Aug. 11, 2016.

(51) Int. Cl.
G06F 15/16 (2006.01)
H04N 21/2662 (2011.01)
(Continued)

(52) U.S. Cl.
CPC ..... *H04N 21/2662* (2013.01); *H04L 65/4084* (2013.01); *H04L 65/608* (2013.01);
(Continued)

(58) Field of Classification Search
CPC ... H04L 65/4084; H04L 67/02; H04L 65/608; H04N 21/2187; H04N 21/23439;
(Continued)

(56) References Cited

U.S. PATENT DOCUMENTS 8,234,350 B1 * 7/2012 Gu ............ H04N 21/8458
709/217
8,380,786 B2 * 2/2013 Hoffert ............ G06F 16/9577
709/203
(Continued)

FOREIGN PATENT DOCUMENTS

WO 2012021543 A1 2/2012
WO 2014152047 A2 9/2014

OTHER PUBLICATIONS

Huysegems, Rafael, et al., "HTTP/2-Based Methods to Improve the Live Experience of Adaptive Streaming", Multimedia, ACM, 2 Penn Plaza, Suite 701, New York, NY 10121-0701 USA, Oct. 13, 2015, pp. 541-550.
(Continued)

*Primary Examiner* — Imad Hussain
(74) *Attorney, Agent, or Firm* — Murphy, Bilak & Homiller, PLLC (57) ABSTRACT

There is provided a client device for receiving a live adaptive bitrate stream, the client device further arranged to receive a manifest of segments of which the live adaptive bitrate stream is comprised and request at least one segment of the live adaptive bitrate stream. The client device is further arranged to subscribe to a push service associated with the manifest files for the live adaptive bitrate stream.

7 Claims, 9 Drawing Sheets

(51) Int. Cl.
*H04L 29/06* (2006.01)
*H04N 21/262* (2011.01)
*H04N 21/845* (2011.01)
*H04L 29/08* (2006.01)
*H04N 21/2187* (2011.01)
*H04N 21/2343* (2011.01)
*H04N 21/84* (2011.01)
*H04N 21/643* (2011.01)

(52) U.S. Cl.
CPC ......... *H04L 67/02* (2013.01); *H04N 21/2187* (2013.01); *H04N 21/23439* (2013.01); *H04N 21/26258* (2013.01); *H04N 21/26291* (2013.01); *H04N 21/64322* (2013.01); *H04N 21/84* (2013.01); *H04N 21/8456* (2013.01)

(58) Field of Classification Search
CPC ....... H04N 21/26258; H04N 21/26291; H04N 21/2662; H04N 21/64322; H04N 21/84; H04N 21/8456
See application file for complete search history.

(56) References Cited

U.S. PATENT DOCUMENTS

| | | | | |
|---|---|---|---|---|
| 8,949,307 | B2* | 2/2015 | Oplinger | H04L 67/32 709/201 |
| 9,654,528 | B1* | 5/2017 | Cho | H04N 21/23406 |
| 10,123,087 | B1* | 11/2018 | Killick | H04N 21/2343 |
| 10,277,928 | B1* | 4/2019 | Joliveau | H04N 21/26258 |
| 10,277,929 | B1* | 4/2019 | McLeod | H04N 21/2187 |
| 10,313,721 | B1* | 6/2019 | McLeod | H04N 21/2387 |
| 2011/0307581 | A1 | 12/2011 | Furbeck et al. | |
| 2012/0042050 | A1 | 2/2012 | Chen et al. | |
| 2012/0110120 | A1* | 5/2012 | Willig | H04L 65/1016 709/217 |
| 2012/0207088 | A1* | 8/2012 | Liu | H04L 65/608 370/328 |
| 2012/0254456 | A1* | 10/2012 | Visharam | H04N 21/2343 709/231 |
| 2013/0311670 | A1* | 11/2013 | Tarbox | H04N 21/6125 709/231 |
| 2013/0312046 | A1* | 11/2013 | Robertson | H04N 21/472 725/93 |
| 2014/0164547 | A1* | 6/2014 | Fullagar | H04L 67/2847 709/213 |
| 2014/0201796 | A1* | 7/2014 | Moon | H04H 60/13 725/110 |
| 2014/0372624 | A1* | 12/2014 | Wang | H04L 69/18 709/231 |
| 2014/0379871 | A1* | 12/2014 | Van Brandenburg | H04L 65/1069 709/219 |
| 2015/0067722 | A1* | 3/2015 | Bjordammen | G06Q 30/0253 725/32 |
| 2015/0088965 | A1* | 3/2015 | Pakulski | H04L 65/4092 709/203 |
| 2015/0180924 | A1* | 6/2015 | O'Callaghan | H04L 43/0829 709/219 |
| 2015/0256583 | A1* | 9/2015 | Rosenzweig | H04N 21/8456 709/219 |
| 2015/0288730 | A1* | 10/2015 | Friedrich | H04L 65/607 709/219 |
| 2015/0334153 | A1* | 11/2015 | Koster | H04L 67/32 709/219 |
| 2016/0112484 | A1* | 4/2016 | Liu | H04L 65/4092 709/231 |
| 2016/0127440 | A1* | 5/2016 | Gordon | H04N 21/23439 709/219 |
| 2016/0269459 | A1* | 9/2016 | Harden | H04L 65/4076 |
| 2016/0294898 | A1* | 10/2016 | Wheelock | H04L 65/602 |
| 2016/0360265 | A1* | 12/2016 | Flick | H04N 21/4334 |
| 2016/0366202 | A1* | 12/2016 | Phillips | H04L 65/602 |
| 2017/0123713 | A1* | 5/2017 | Fisher | G06F 3/067 |
| 2017/0272485 | A1* | 9/2017 | Gordon | H04L 65/601 |
| 2017/0289639 | A1* | 10/2017 | Reisner | H04N 21/812 |
| 2017/0310752 | A1* | 10/2017 | Knothe | H04L 67/26 |
| 2017/0310753 | A1* | 10/2017 | Knothe | H04L 67/1097 |
| 2017/0353516 | A1* | 12/2017 | Gordon | H04L 67/10 |
| 2017/0359628 | A1* | 12/2017 | Sachdev | H04N 21/812 |
| 2017/0374116 | A1* | 12/2017 | Phillips | H04W 4/029 |
| 2017/0374121 | A1* | 12/2017 | Phillips | H04N 21/26258 |
| 2018/0020246 | A1* | 1/2018 | Harrison | H04L 65/605 |
| 2018/0026733 | A1* | 1/2018 | Yang | H04N 21/4882 725/33 |
| 2018/0115796 | A1* | 4/2018 | Yang | H04N 21/8586 |
| 2018/0367592 | A1* | 12/2018 | Thomas | H04L 65/601 |
| 2019/0036986 | A1* | 1/2019 | Sathyanarayana | H04L 65/602 |
| 2019/0222622 | A1* | 7/2019 | Jones | H04L 65/4092 |
| 2019/0222879 | A1 | 7/2019 | Jones et al. | |
| 2019/0327505 | A1* | 10/2019 | Schwimmer | H04N 21/23424 |
| 2019/0342356 | A1* | 11/2019 | Thomas | H04N 21/234309 |
| 2019/0394538 | A1* | 12/2019 | Caulfield | H04N 21/26258 |
| 2020/0053430 | A1* | 2/2020 | Burke | H04N 21/4334 |

OTHER PUBLICATIONS

Unknown, Author, "Internet Video Streaming—ABR Part 2", Eyevinn Technology, Mar. 14, 2018, 8 pages.

* cited by examiner

ADAPTIVE BITRATE STREAMING OF LIVE CONTENT WITH MANIFEST UPDATE PUSH NOTIFICATION OR LONG POLL

TECHNICAL FIELD

The present application relates to a client device, a method in a client device, a server, a method in a server, an apparatus for receiving a live adaptive bitrate stream, an apparatus for delivering a live adaptive bitrate stream, and a computer-readable medium.

BACKGROUND

Adaptive bitrate (ABR) streaming has become an important technology for delivering video content over an internet connection. This technology allows for a variation in bandwidth which is typical for a home internet connection. This variation may be due to local contention with other devices and users in the home using the same modem connection for other purposes. A further cause for the variation in available bandwidth is local loop contention where the bandwidth between a plurality of modems in a neighborhood must be shared between a respective plurality of homes.

ABR streaming allows for a variation in bandwidth by measuring the available bandwidth between a streaming device and a server that is sending the streamed video content, and providing the video stream at a bit rate that maximizes the use of the available bandwidth. To achieve this, a server that uses ABR will make the streamed video available in a series of segments, with each segment available in multiple versions, each version encoded at a different bit rate. The ABR streaming client in the streaming device then selects the appropriate segments. The available bit rates are normally fixed.

To allow the ABR streaming client to identify and retrieve appropriate segments of the ABR stream, the server makes a manifest file (also referred to as a manifest) available to ABR streaming clients. The manifest file lists the segments of the video stream that the server has available for download. A streaming client must first download the manifest file before it can identify which segments to download. The streaming client then requests the appropriate segments and once it receives these it can begin decoding and presenting the content.

Adaptive Bit Rate (ABR) using HTTP Adaptive Streaming (HAS) is increasingly used as a format for live operation. That is, delivery of live video content. Live content may be defined as 'not pre-recorded', and includes content that is generated and substantially immediately distributed to a client device. HTTP Adaptive Streaming was developed originally with on-demand content in mind, where all the segments are known before streaming begins. With on-demand content, all manifests that describe the segments of a piece of content are available for a client to download when streaming of that piece of content begins. When a client requests a manifest related to on-demand content, that manifest will be available for that client.

Fundamentally, when ABR streaming is applied to live content, segments are generated only shortly before the client receives them. As such, manifest files must be created as the segments related to the live content are created. If a client requests an updated manifest file before it has been created, it will not receive the file, and will have to re-request it a short time later. However, the client has no way of knowing when the updated manifest file will be available. For example, in live operation, HAS manifest files are updated each time a new complete segment of media data is available. The time interval between new segments becoming available is unlikely to be constant as it will depend on the content and encoding complexity.

To find an updated manifest the client polls the server to download the server's current manifest. If a poll comes in immediately before the manifest is updated, so the poll just misses the update, then the client will have to wait until the next poll to receive the updated manifest. This results in a significant and variable latency between the availability of new media segments and when the client is aware of them. This latency can be up to a complete poll interval (typically several seconds). This in turn leads to more difficult buffering and in the presence of congestion or limited bandwidth can lead to impairment of client playback such as stalling or excessively changing bit rates. When the segment sizes are widely variable (for example due to advertising), the impairments are even more significant.

More frequent polling by clients would reduce any time delay between a manifest being made available and it being downloaded by a client, but this would result in increased signaling overhead which would be particularly problematic for streaming severs having many concurrent users.

The updated manifest will likely include segments that were listed on the previous manifest, hence it is aptly referred to as an update. However, in practice this is a new file, and so the updated manifest can be referred to as a new manifest file, or a new manifest. Herein it will be referred to as an updated manifest.

SUMMARY

There is provided a client device for receiving a live adaptive bitrate stream, the client device further arranged to receive a manifest of segments of which the live adaptive bitrate stream is comprised and request at least one segment of the live adaptive bitrate stream. The client device is further arranged to subscribe to a push service associated with the manifests for the live adaptive bitrate stream.

The address for subscription to the push service associated with the manifests for the live adaptive bitrate stream may be included in a manifest. Upon receiving the first manifest of a live adaptive stream, the client device detects the address for subscribing to the push notification service and sends a subscription request to that address. The manifest of segments is also referred to as a manifest file, or simply a manifest.

The push service may use HTTP long poll. The subscription to a push service may comprise sending a request for an updated manifest, the request for an updated manifest indicating the current time at the client device. Alternatively, the request for an updated manifest may indicate a time that the last received manifest was generated manifest.

The client device may wait for a pushed message from the push service. The pushed message may comprise the updated manifest. The pushed message may comprise a notification that an updated manifest is available, the client device then further arranged to request an updated manifest when a notification of an updated manifest is received.

There is further provided a method in a client device arranged to receive a live adaptive bitrate stream from a server, the method comprising: receiving a manifest of segments of which the live adaptive bitrate stream is comprised; and requesting at least one segment of the live adaptive bitrate stream. The method further comprises subscribing to a push service associated with the manifests for the live adaptive bitrate stream.

The address for subscription to the push service associated with the manifests for the live adaptive bitrate stream may be included in a manifest. The method may further comprise, upon receiving the first manifest of a live adaptive stream, detecting the address for subscribing to the push notification service and sending a subscription request to that address.

The push service may comprise HTTP long poll. The subscription to a push service may comprise subscribing to a push service by sending a request for an updated manifest, the request for an updated manifest indicating the current time at the client device. Alternatively, the request for an updated manifest may indicate a time that the last received manifest was generated, and where the manifest has not been updated since that time.

The method may further comprise receiving a pushed message from the push service. The pushed message may comprise the updated manifest. The pushed message may comprise a notification that an updated manifest is available, the client device then further arranged to request an updated manifest when a notification of an updated manifest is received.

There is further provided a server arranged to deliver a live adaptive bitrate stream, the server further arranged to: deliver adaptive bitrate segments requested by at least one client device; and distribute a manifest listing available adaptive bitrate segments. The server is further arranged to issue a pushed message to subscribing client devices when the manifest is updated with newly available adaptive bitrate segments.

The pushed message may comprise the updated manifest. The pushed message may comprise a notification that an updated manifest is available.

The server may be further arranged to receive a subscription request to a push service associated with the manifests for the live adaptive bitrate stream. The subscription request may comprise a request for an updated manifest, the request for an updated manifest indicating the current time at the client device. Alternatively, the request for an updated manifest may indicate a time that the last received manifest was generated, and where the manifest has not been updated since that time.

There is further provided a method in a server, the server arranged to deliver a live adaptive bitrate stream, the method comprising: delivering adaptive bitrate segments requested by at least one client device; and delivering a manifest listing available adaptive bitrate segments. The method further comprises issuing a pushed message to subscribing client devices when the manifest is updated with newly available adaptive bitrate segments.

The pushed message may comprise push notification that an updated manifest is available. The pushed message may comprise the updated manifest.

Each manifest issued by the server may include an address for the push notification service. A client device can subscribe to the push notification service by sending a subscription request to that address.

The method may further comprise receiving a subscription request to a push service associated with the manifests for the live adaptive bitrate stream. The push service may comprise HTTP long poll. The subscription request may comprise a request for an updated manifest, the request for an updated manifest indicating the current time at the client device. Alternatively, the request for an updated manifest may indicate a time that the last received manifest was generated, and where the manifest has not been updated since that time.

There is further provided an apparatus for receiving a live adaptive bitrate stream comprising a processor and a memory, said memory containing instructions executable by said processor whereby said apparatus is operative to receive a manifest of segments of which the live adaptive bitrate stream is comprised. The apparatus is further operative to request at least one segment of the live adaptive bitrate stream, and subscribe to a push service associated with the manifests for the live adaptive bitrate stream.

There is further provided an apparatus for delivering a live adaptive bitrate stream comprising a processor and a memory, said memory containing instructions executable by said processor whereby said apparatus is operative to: deliver adaptive bitrate segments requested by at least one client device; and distribute a manifest listing available adaptive bitrate segments. The apparatus is further operative to issue a pushed message to subscribing client devices when the manifest is updated with newly available adaptive bitrate segments.

There is further provided an apparatus for receiving a live adaptive bitrate stream comprising a processor and a memory, said memory containing instructions executable by said processor whereby said apparatus comprising: a module for receiving a manifest of segments of which the live adaptive bitrate stream is comprised; and a module for requesting at least one segment of the live adaptive bitrate stream. The apparatus further comprises a module for subscribing to a push service associated with the manifests for the live adaptive bitrate stream.

There is further provided an apparatus for delivering a live adaptive bitrate stream comprising a processor and a memory, said memory containing instructions executable by said processor whereby said apparatus comprising: a module for delivering adaptive bitrate segments requested by at least one client device; and a module for distributing a manifest listing available adaptive bitrate segments. The apparatus further comprises a module for issuing a pushed message to subscribing client devices when the manifest is updated with newly available adaptive bitrate segments.

There is further provided a computer-readable medium, carrying instructions, which, when executed by computer logic, causes said computer logic to carry out any of the methods defined herein.

There is further provided a computer-readable storage medium, storing instructions, which, when executed by computer logic, causes said computer logic to carry out any of the methods defined herein. The computer program product may be in the form of a non-volatile memory or volatile memory, e.g. an EEPROM (Electrically Erasable Programmable Read-only Memory), a flash memory, a disk drive, or a RAM (Random-access memory).

The live adaptive bitrate stream contains live content. Live content is content that is received at the streaming system shortly before being sent to clients, any delay resulting from the time taken to process incoming data into a form ready for live ABR streaming.

BRIEF DESCRIPTION OF THE DRAWINGS

A method and apparatus for improved adaptive bitrate streaming of live content will now be described, by way of example only, with reference to the accompanying drawings, in which.

DETAILED DESCRIPTION

Figure 1:
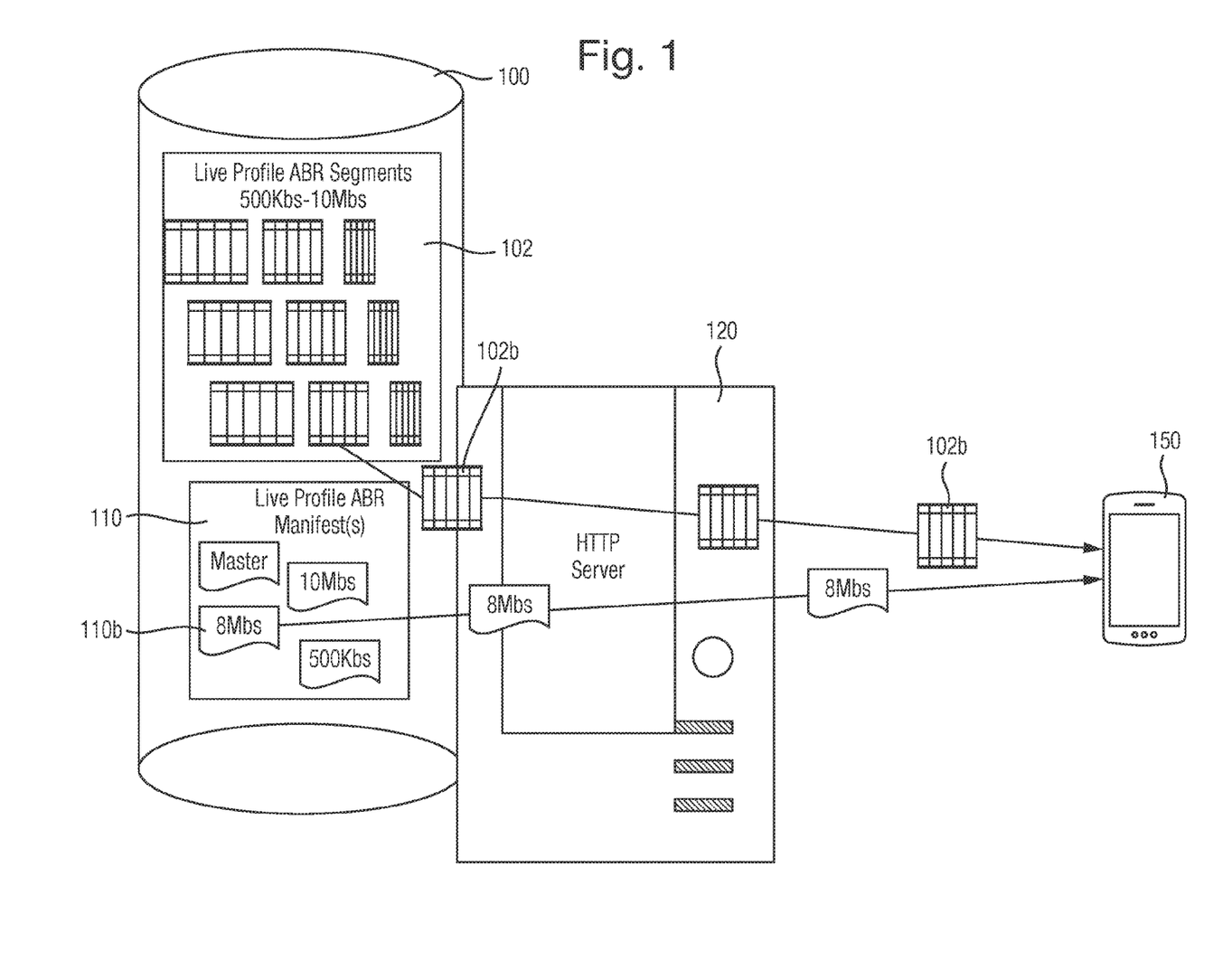
FIG. 1 illustrates a known adaptive bitrate (ABR) streaming system.

FIG. 1 illustrates a known adaptive bitrate (ABR) streaming system. The system comprises an origin server 100, an HTTP server 120, which may or may not be physically co-located with the origin server 100, and a client device 150. The origin server 100 creates a set of segments 102 which are made available to the client device 150 via the http server 120. In order for the client device 150 to know what segments are available, the origin server 100 creates a manifest 110.

In operation, the client device 150 sends a query to the HTTP server 120, the query requesting a particular live content stream. The HTTP server 120 retrieves a manifest file 110b from the origin server 100 and delivers this to the client device. The client device reads the manifest file 110b, identifies the segment it requires and sends a request for this segment to the HTTP server 120. The HTTP server 120 retrieves the requested segment 102b from the origin sever 100 and delivers this to the client device 150.

That segment will comprise perhaps 10 seconds of video content. Before that segment of video content stops playing the client device must have received a subsequent segment. To locate the subsequent segment, the client device requires an updated manifest which reflects the newly available segments. The client device 150 polls the HTTP server 120 to download the current manifest. If a poll comes in immediately before the manifest is updated, so the poll just misses the update, then the client device 150 will have to wait until the next poll to receive the updated manifest. This results in a significant and variable latency between the availability of new media segments and when the client device 150 is aware of them. This latency can be up to a complete poll interval (typically several seconds). This in turn leads to more difficult buffering and in the presence of congestion or limited bandwidth can lead to client playback stalling or excessively changing bit rates. When the segment sizes are widely variable (for example due to advertising), the impairments are even more significant.

In practice, the client device may attempt to maintain a buffer of several segments, perhaps three 10 second segments. In that case the client device will be attempting to download the fourth segment while the first one is playing so that it can download the fifth segment while the second one is playing, and so on.

In order to address the above described problems, there is provided a system wherein the client device is further arranged to subscribe to a push service associated with the manifest files for the live adaptive bitrate stream. In this system, the server is arranged to issue a pushed message to subscribing client devices when the manifest file is updated with newly available adaptive bitrate segments. Such a system may be embodied in a plurality of ways. Two embodiments are described herein; one uses a standalone push notification that informs the client device when an updated manifest is available, the other uses a modified HTTP long poll to cause an updated manifest to be delivered to the client as soon as it becomes available.

One way to implement a push service is to use a push notification. The client subscribes to a service offering a manifest update notification service, and upon receipt of a manifest update notification, the client requests the manifest and receives the recent update.

The address for subscription to the push service associated with the manifest files for the live adaptive bitrate stream may be included in the manifest files. Upon receiving the first manifest of a live adaptive stream, the client device detects the address for subscribing to the push notification service and sends a subscription request to that address.

Figure 2:
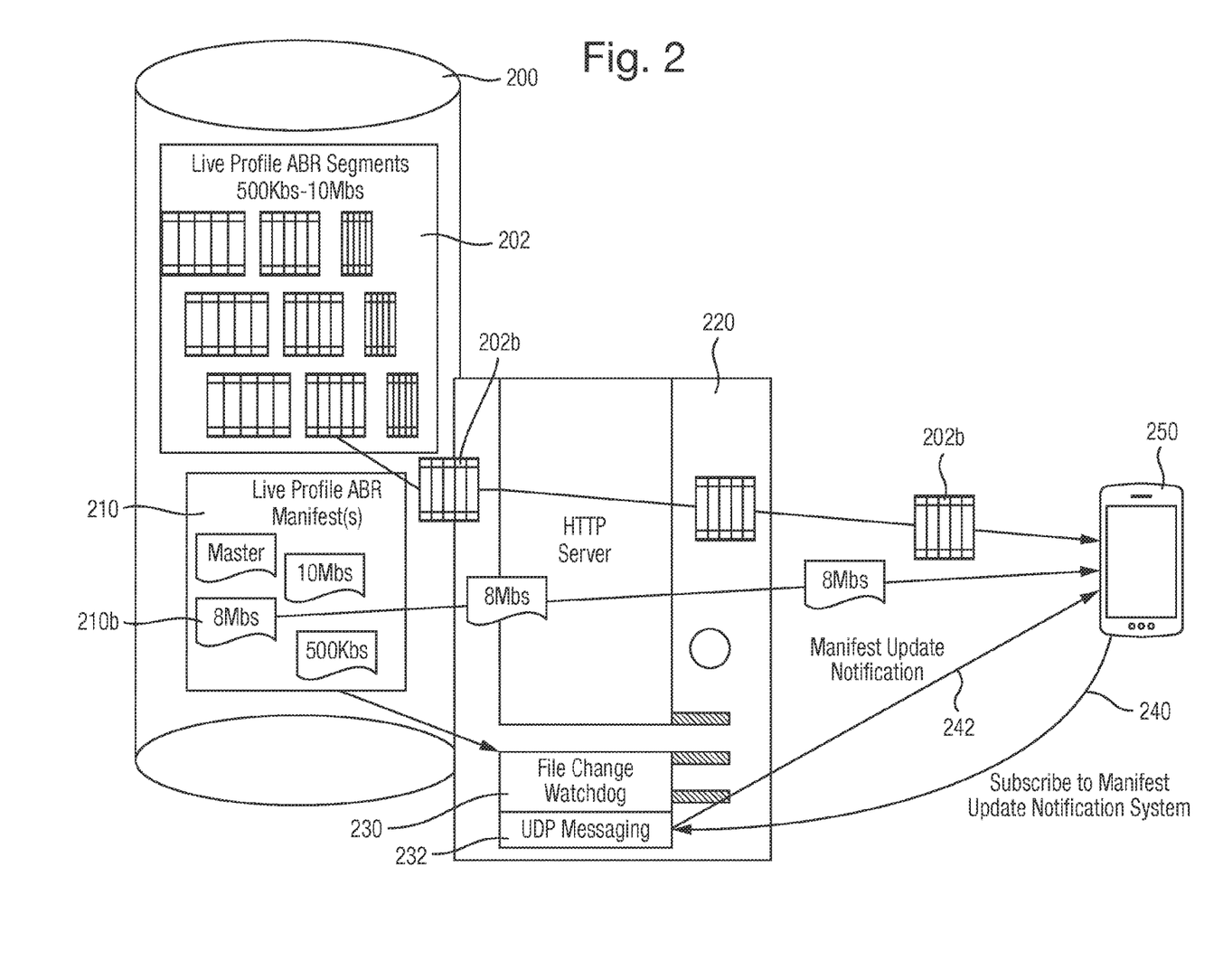
FIG. 2 illustrates a push notice system.

FIG. 2 illustrates a push notice system. This is implemented in an adaptive bitrate (ABR) streaming system similar to that described in relation to FIG. 1. The system comprises an origin server 200, an HTTP server 220, which may or may not be physically co-located with the origin server 200, and a client device 250. The HTTP server 220 additionally comprises a file change watchdog 230 and a UDP messaging service 232. The origin server 200 creates a set of segments 202 which are made available to the client device 250 via the http server 220. In order for the client device 250 to know what segments are available, the origin server 200 creates a manifest 210.

In operation, the client device 250 sends a query to the HTTP server 220, the query requesting a particular live content stream. The HTTP server 220 retrieves a manifest file 210b from the origin server 200 and delivers this to the client device. The client device reads the manifest file 210b, identifies the segment it requires and sends a request for this segment to the HTTP server 220. The HTTP server 220 retrieves the requested segment 202b from the origin sever 200 and delivers this to the client device 250.

To locate a subsequent segment, the client device 250 requires an updated manifest which reflects the newly available segments. In anticipation of receiving the next segment, and preferably upon initiating streaming, the client device sends a subscription request 240 to the manifest update notification system. The subscription request 240 identifies for which stream or manifest the client device 250 requires notification of updates. A file change watchdog 230 monitors the manifest file available at the origin server 200, and when it is updated, the file change watchdog pushes a manifest updated notification, via the UDP messaging service 232 to all subscribed client devices.

In response to receiving a manifest update notification message 242, the client device 250 requests the current manifest in the usual way. In this way, the client device will receive the updated manifest promptly after it is updated, allowing for better buffering and smoother playback of live content received via the streaming service.

The above arrangement comprises a client device subscribing to a push notification using a connectionless protocol such as UDP. This might take the form of either a multicast join, or the client device being added to a list of unicast UDP recipients. Alternatively, the push notice might be delivered using a connection-oriented protocol establishing a request to the same server (or its proxy), with the origin server returning a short message indicating that a manifest update has occurred.

Figure 3:
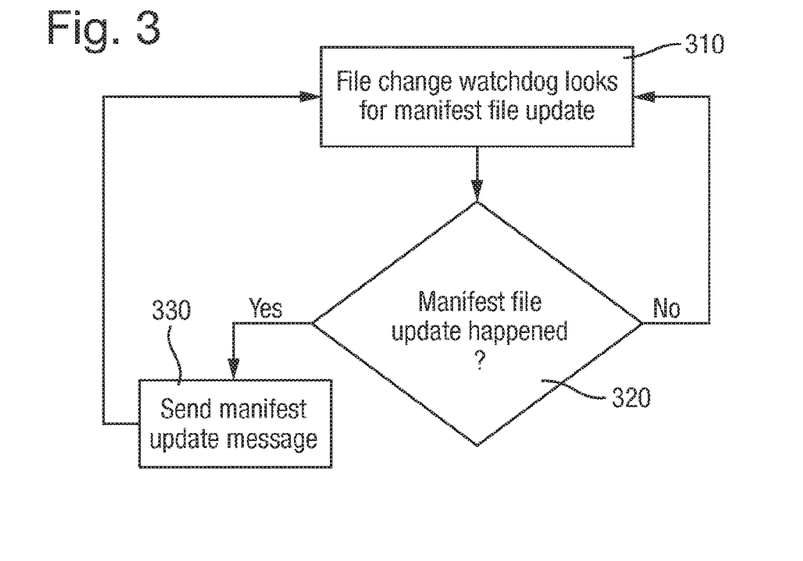
FIG. 3 illustrates a method performed by a file change watchdog in a push notice system.

FIG. 3 illustrates a method performed by the file change watchdog 230. The file change watchdog checks 310 the currently available manifest file and determines 320 if that manifest file has been updated. If it has not, the file change watchdog checks 310 again, after a short timeout interval. If the manifest file has been updated, the file change watchdog sends 330 a manifest update message to the messaging service 232. The messaging service 232 then pushes a manifest update notification to all clients that had subscribed to the notification service for that manifest.

Figure 4:
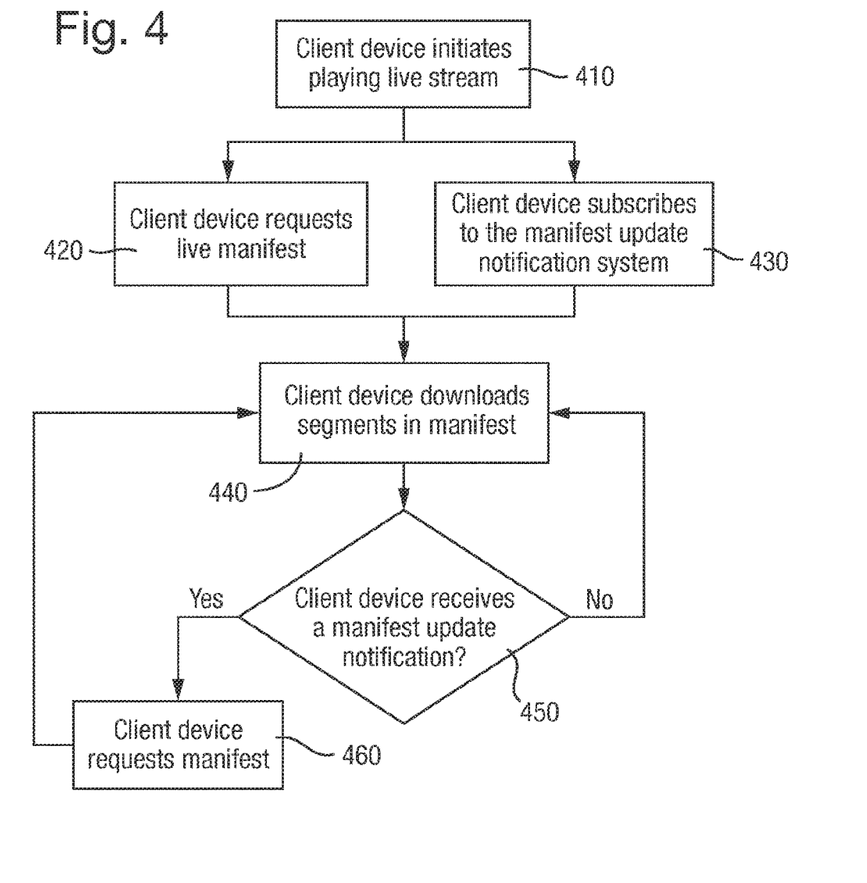
FIG. 4 illustrates a method in the client device of a push notice system.

FIG. 4 illustrates a method in the client device 250. The client device initiates 410 playback of a live video stream. To identify the segments it should download, the client device requests 420 a manifest that describes the segments of the live video stream. At the same time, the client device subscribes 430 to a manifest update notification service associated with the live video stream. After receiving the requested manifest the client device identifies and begins downloading 440 segments of the live content. The client device uses the downloaded manifest to identify and request segments of the live content until it determines 450 that a notification of a manifest update is received, at which point the client device requests 460 an updated manifest. Using the manifest update notification service in this way, the client device will consistently download an updated manifest file promptly after it is made available, allowing for better buffering and smoother playback of live content received via the streaming service.

The address for subscription to the push notification service associated with the manifest files for the live adaptive bitrate stream may be included in the manifests. Upon receiving the first manifest of a live adaptive stream, the client device detects the address for subscribing to the push notification service and sends a subscription request to that address.

Another way to implement a push service is to use HTTP long poll. HTTP Long-polling is a technique used to push updates to a web client. A connection is held open between the web client and the web server so that when the server has new information, such as an updated manifest file, it can push it to the client. That connection is then closed.

Another way to implement a push service is to use the If-Modified-Since HTTP 1.1 header for the GET manifest request. The If-Modified-Since request-header field is used with a method to make it conditional: if the requested variant has not been modified since the time specified in this field, an entity will not be returned from the server; instead, a 304 (not modified) response will be returned without any message-body.

If-Modified-Since="If-Modified-Since" ":" HTTP-date
An example of the field is:
If-Modified-Since: Sat, 29 Oct. 1994 19:43:31 GMT
A GET method with an If-Modified-Since header and no Range header requests that the identified entity be transferred only if it has been modified since the time given by the If-Modified-Since header. The algorithm for determining this includes the following cases:
  a) If the request would normally result in anything other than a 200 (OK) status, or if the passed If-Modified-Since date is invalid, the response is exactly the same as for a normal GET. A date which is later than the server's current time is invalid.
  b) If the variant has been modified since the If-Modified-Since date, the response is exactly the same as for a normal GET.
  c) If the variant has not been modified since a valid If-Modified-Since date, the server SHOULD return a 304 (Not Modified) response.

The purpose of this feature is to allow efficient updates of cached information with a minimum amount of transaction overhead.
  Note: The Range request-header field modifies the meaning of If-Modified-Since; see section 14 of w3.org RFC 2616 Fielding, et al. for full details. [http://www.w3.org/Protocols/rfc2616/rfc2616-sec14.html]
  Note: If-Modified-Since times are interpreted by the server, whose clock might not be synchronized with the client.
  Note: When handling an If-Modified-Since header field, some servers will use an exact date comparison function, rather than a less-than function, for deciding whether to send a 304 (Not Modified) response. To get best results when sending an If-Modified-Since header field for cache validation, clients are advised to use the exact date string received in a previous Last-Modified header field whenever possible.
  Note: If a client uses an arbitrary date in the If-Modified-Since header instead of a date taken from the Last-Modified header for the same request, the client should be aware of the fact that this date is interpreted in the server's understanding of time. The client should consider unsynchronized clocks and rounding problems due to the different encodings of time between the client and server. This includes the possibility of race conditions if the document has changed between the time it was first requested and the If-Modified-Since date of a subsequent request, and the possibility of clock-skew-related problems if the If-Modified-Since date is derived from the client's clock without correction to the server's clock. Corrections for different time bases between client and server are at best approximate due to network latency.

The result of a request having both an If-Modified-Since header field and either an If-Match or an If-Unmodified-Since header fields is undefined by this specification.

When the ABR client issues a GET message to retrieve the manifest, it would set the If-Modified-Since header using the current time on the device. A known ABR delivery server would return a 304 Not Modified Response. However, an improved ABR delivery server as described herein delays sending the manifest response until the manifest has been modified.

Figure 5:
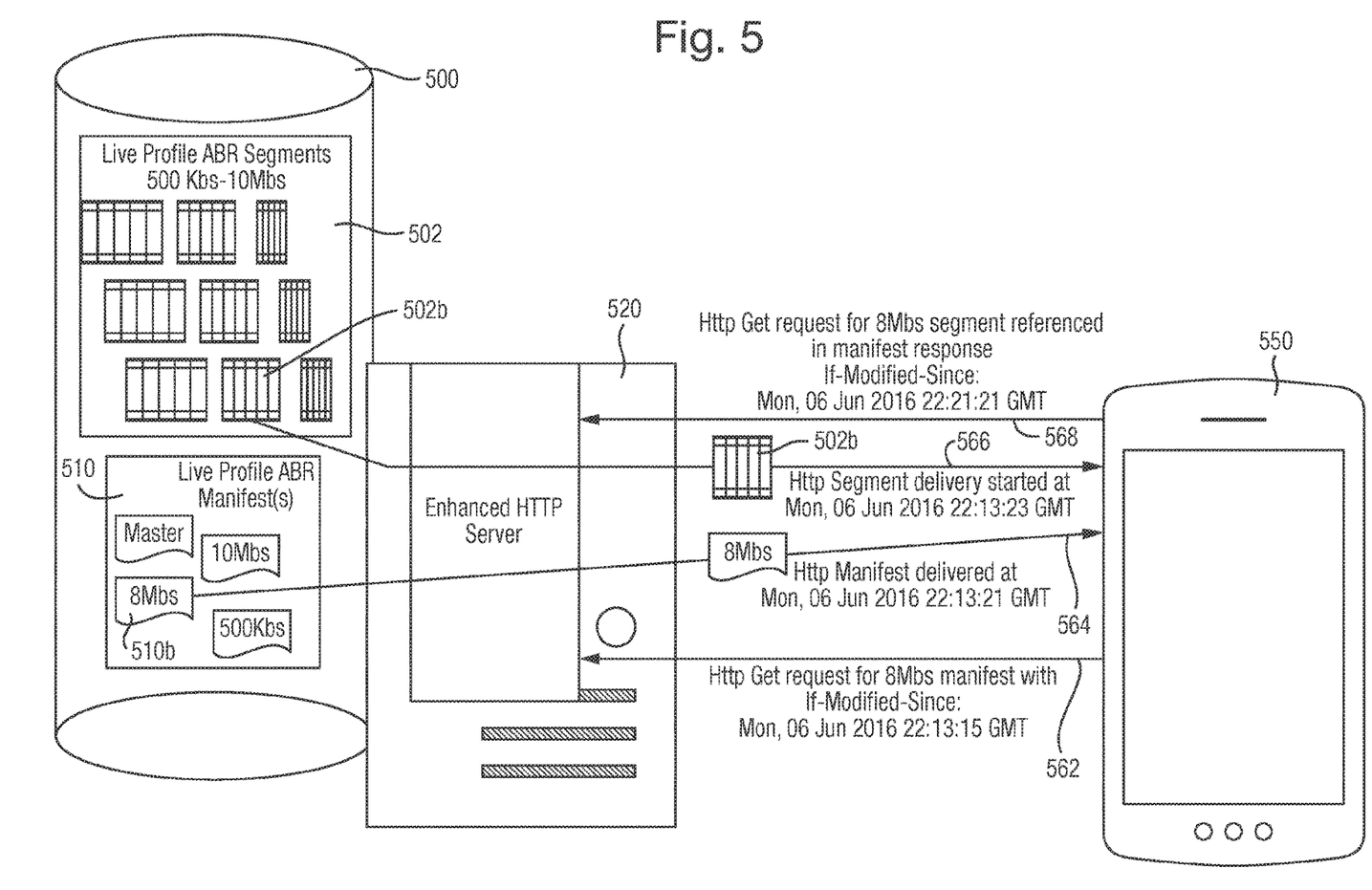
FIG. 5 illustrates the use of the if-modified-since header in a new way.

FIG. 5 illustrates a streaming system arranged to use the if-modified-since header in this new way. The system comprises an origin server 500, an enhanced HTTP server 520, which may or may not be physically co-located with the origin server 500, and a client device 550. The origin server 500 creates a set of segments 502 which are made available to the client device 550 via the HTTP server 520. In order for the client device 550 to know what segments are available, the origin server 500 creates a manifest 510.

In operation, the client device 550 sends a get request 562 to the HTTP server 520, the request pertaining to a manifest for a particular live content stream. The get request 562 comprises an if-modified-since HTTP header with a corresponding time field containing the current time at the client device 550. In response, the enhanced HTTP server 520 checks the currently available manifest at the origin server 500 which is older than the time stamp given in the ifmodified-since field of the request 562 so the currently available manifest is not returned. The enhanced HTTP server waits for the manifest file to be updated, using, for example a file change watchdog as described above. When the enhanced HTTP server 520 identifies that the manifest has been updated, it sends 564 this updated manifest 510*b* to the client device 550. Client device 550 then chooses and requests (not shown) a particular segment of content. A segment 502*b* is delivered 566 to client device 550. The process then repeats with client device 550 sending another HTTP get request 568 to the enhanced HTTP server 520, the request 568 including an if-modified-since header with the new current time at the client device in the time field.

In known (non-enhanced) HTTP Servers, if a client makes an http request with the If-Modified-Since field set in the http header and the file does not meet the criteria, the server will respond with a 304 Message File Not Modified. The Enhanced HTTP server described above will monitor the requested file and wait until an update happens on the file. As soon as the update happens, the file will be sent to the requester. In the event the file has been modified since the time given in the if-modified-since field, the server will immediately respond with the requested file.

Figure 6:
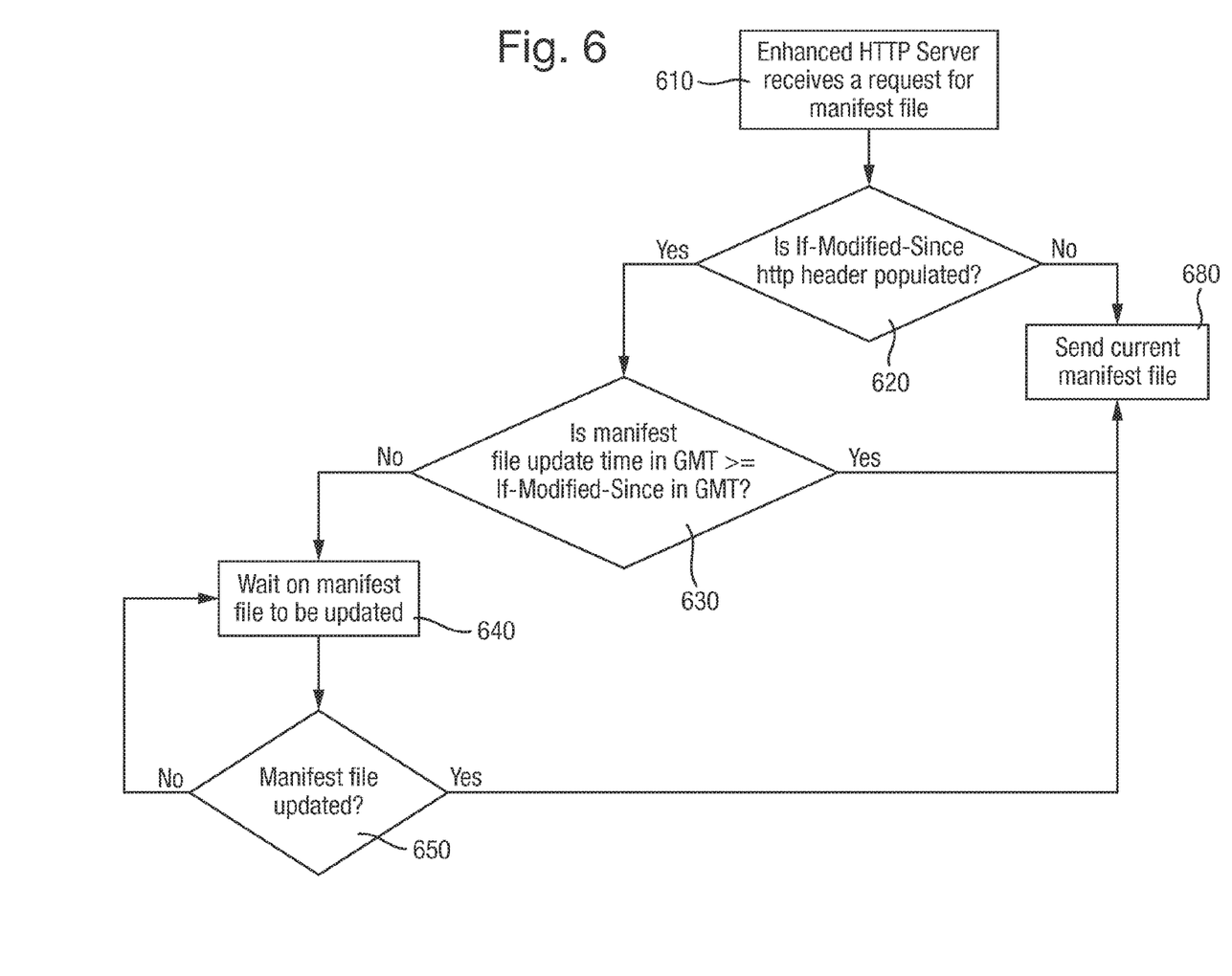
FIG. 6 illustrates a method performed in an enhanced HTTP server.

FIG. 6 illustrates a method performed in the enhanced HTTP server described above. The enhanced HTTP server receives 610 a request for a manifest file. The server determines 620 if the if-modified-since http header is populated. If it is not, the server immediately sends 680 the current version of the requested manifest file. If it is determined 620 that the if-modified-since header is populated, then the server determines 630 if the time at which the manifest file was last updated is later than the if-modified-since field. If it was, then the server sends 680 the current version of the requested manifest file. If the time at which the manifest file was last updated is earlier than the if-modified-since field, then the server waits 640 for the manifest file to be updated. When the server determines 650 that the manifest file has been updated, then the server sends 680 the current, i.e., newly updated, version of the requested manifest file.

Figure 7:
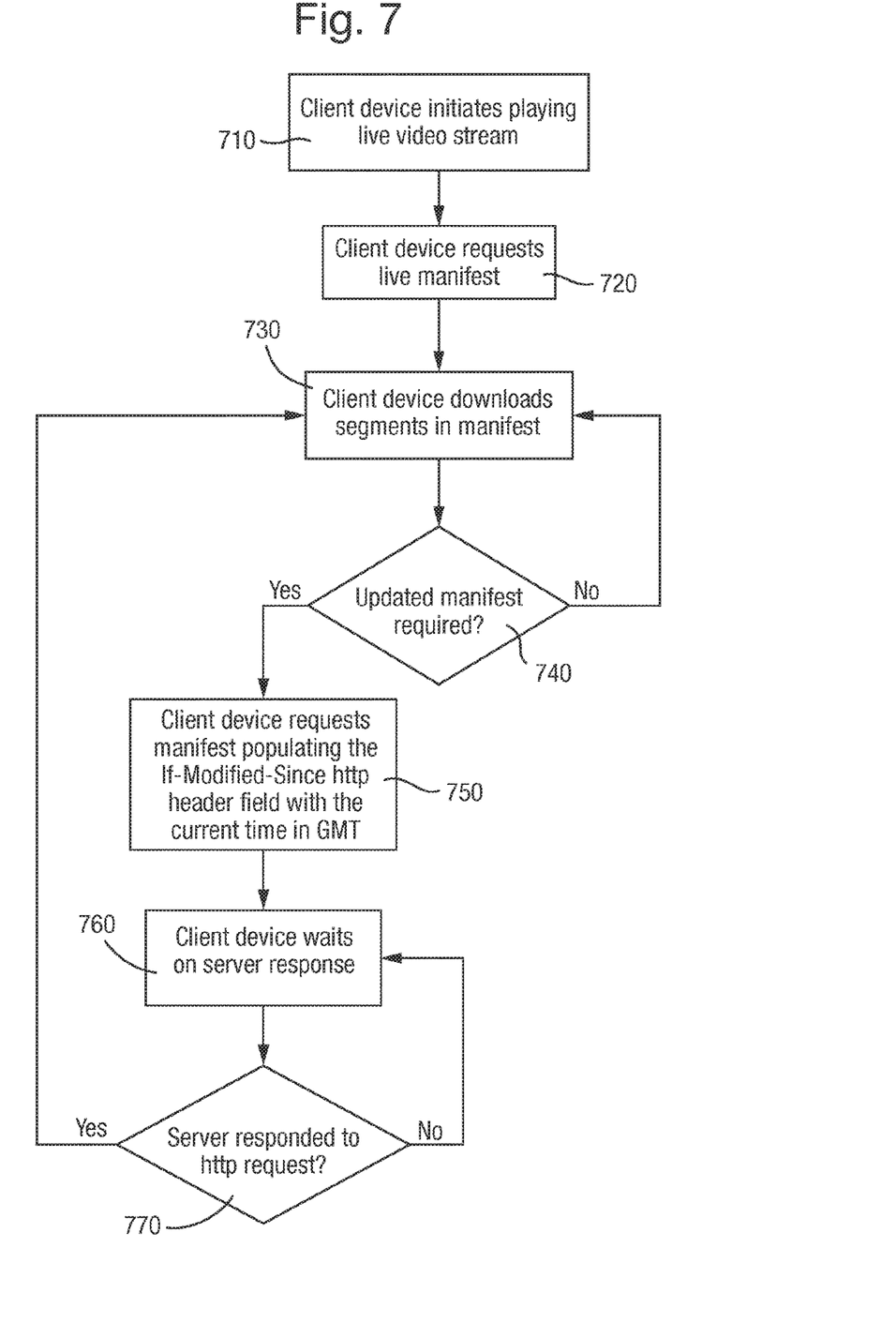
FIG. 7 illustrates a method in a client device communicating with an enhanced HTTP server.

FIG. 7 illustrates a method in a client device, the client device arranged to communicate with an enhanced HTTP server as described above. The client device initiates 710 playback of a live video stream. The client device immediately requests 720 a manifest of segments pertaining to the live content stream. After receipt of the manifest, the client requests and downloads 730 appropriate segments as listed in the manifest. The client device subsequently determines 740 whether an updated manifest is required. This determination is made by the client device identifying that it need an additional segment to maintain its buffer, but the manifest it has does not list such a segment. If an updated manifest file is not required, then the client device requests and downloads 730 further segments as listed in the manifest. If it is determined 740 that an updated manifest is required, then the client device sends a request 750 for the manifest, the request having an if-modified-since field with the current time. The client device then waits 760 for a response. If it is determined that a response is not received 770, then the client device waits 760 some more. When a response is received, the response comprising a newly updated manifest file, the client device requests and downloads 730 appropriate segments as required and as listed in the manifest There is provided a client device for receiving a live adaptive bitrate stream, the client device further arranged to receive a manifest of segments of which the live adaptive bitrate stream is comprised and request at least one segment of the live adaptive bitrate stream. The client device is further arranged to subscribe to a push service associated with the manifest files for the live adaptive bitrate stream.

Each manifest file issued by the server may include an address for the push notification service. A client device is able to subscribe to the push notification service by sending a subscription request to that address.

The push service may use HTTP long poll. The subscription to a push service may comprise sending a request for an updated manifest file, the request for an updated manifest file indicating the current time at the client device. Alternatively, the request for an updated manifest may indicate a time that the last received manifest file was generated, and where the manifest file has not been updated since that time.

The client device may receive a pushed message from the push service. The pushed message may comprise the updated manifest file. The pushed message may comprise a notification that an updated manifest file is available, the client device may then request an updated manifest file when a notification of an updated manifest file is received.

Figure 8:
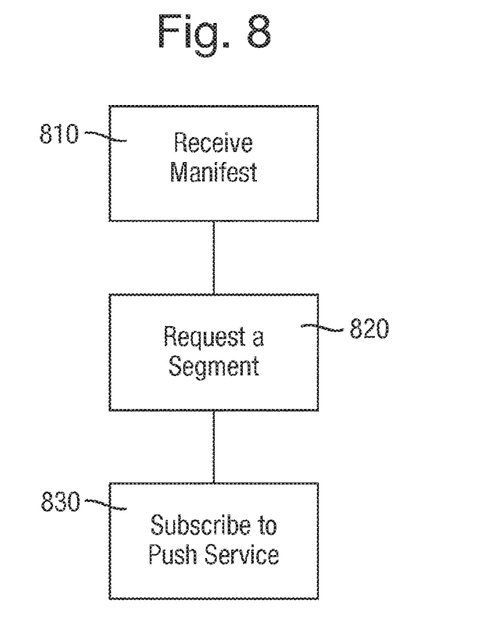
FIG. 8 illustrates a method in a client device.

FIG. 8 illustrates a method in a client device arranged to receive a live adaptive bitrate stream from a server, the method comprising: receiving 810 a manifest of segments of which the live adaptive bitrate stream is comprised; and requesting 820 at least one segment of the live adaptive bitrate stream. The method further comprises subscribing 830 to a push service associated with the manifest files for the live adaptive bitrate stream.

The address for subscription to the push service associated with the manifest files for the live adaptive bitrate stream may be included in a manifest. The method may further comprise, upon receiving the first manifest of a live adaptive stream, detecting the address for subscribing to the push notification service and sending a subscription request to that address.

The push service may comprise HTTP long poll. The subscription to a push service may comprise subscribing to a push service by sending a request for an updated manifest file, the request for an updated manifest file indicating the current time at the client device. Alternatively, the request for an updated manifest may indicate a time that the last received manifest file was generated, and where the manifest file has not been updated since that time.

Figure 9:
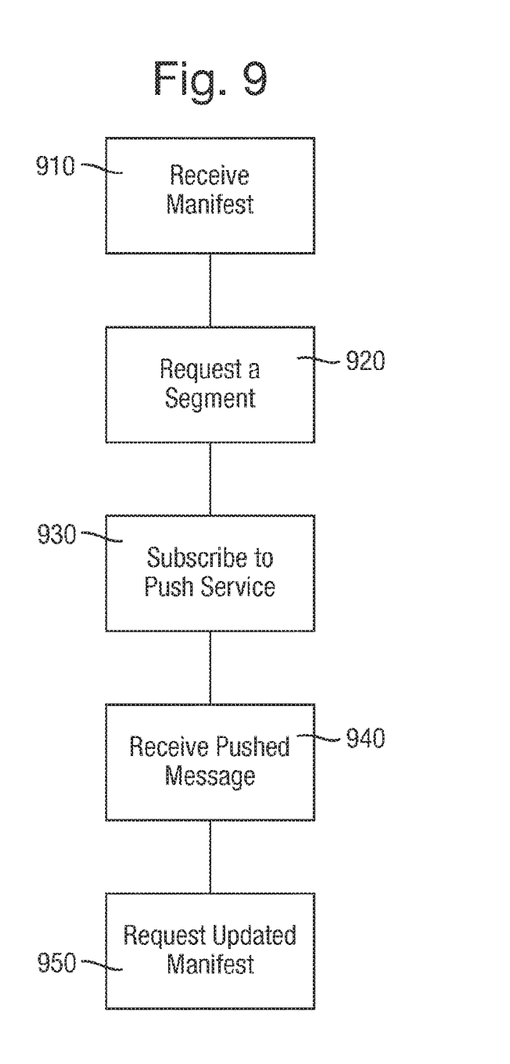
FIG. 9 illustrates a further method in a client device.

FIG. 9 illustrates a further method in a client device arranged to receive a live adaptive bitrate stream from a server, the method comprising: receiving 910 a manifest of segments of which the live adaptive bitrate stream is comprised; and requesting 920 at least one segment of the live adaptive bitrate stream. The method further comprises subscribing 930 to a push service associated with the manifest files for the live adaptive bitrate stream. The method further comprises receiving 940 a pushed message from the push service. The pushed message comprises a notification that an updated manifest file is available, and in response thereto the client device requests 950 an updated manifest file when a notification of an updated manifest file is received. In an alternative the pushed message comprises the updated manifest file.

There is further provided a server arranged to deliver a live adaptive bitrate stream, the server further arranged to: deliver adaptive bitrate segments requested by at least one client device; and distribute a manifest file listing available adaptive bitrate segments. The server is further arranged to issue a pushed message to subscribing client devices when the manifest file is updated with newly available adaptive bitrate segments.

The pushed message may comprise the updated manifest file. The pushed message may comprise a notification that an updated manifest file is available.

The server may be further arranged to receive a subscription request to a push service associated with the manifest files for the live adaptive bitrate stream. The subscription request may comprise a request for an updated manifest file, the request for an updated manifest file indicating the current time at the client device. Alternatively, the request for an updated manifest may indicate a time that the last received manifest file was generated, and where the manifest file has not been updated since that time.

Figure 10:
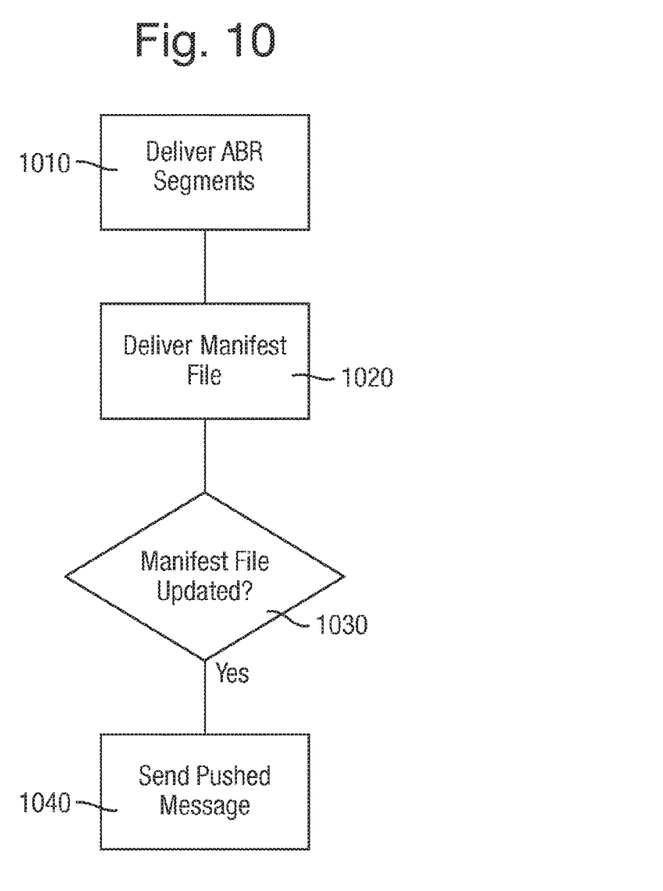
FIG. 10 illustrates a method in a server.

FIG. 10 illustrates a method in a server, the server arranged to deliver a live adaptive bitrate stream, the method comprising: delivering 1010 adaptive bitrate segments requested by at least one client device; and delivering 1020 a manifest file listing available adaptive bitrate segments. The method further comprises issuing 1040 a pushed message to subscribing client devices when it is determined 1030 that the manifest file is updated with newly available adaptive bitrate segments.

The pushed message may comprise push notification that an updated manifest file is available. The pushed message may comprise the updated manifest file.

The address for subscription to the push service associated with the manifest files for the live adaptive bitrate stream may be included in a manifest. The method may further comprise, upon receiving the first manifest of a live adaptive stream, detecting the address for subscribing to the push notification service and sending a subscription request to that address.

The method may further comprise receiving a subscription request to a push service associated with the manifest files for the live adaptive bitrate stream. The push service may comprise HTTP long poll. The subscription request may comprise a request for an updated manifest file, the request for an updated manifest file indicating the current time at the client device. Alternatively, the request for an updated manifest may indicate a time that the last received manifest file was generated, and where the manifest file has not been updated since that time.

Figure 11:
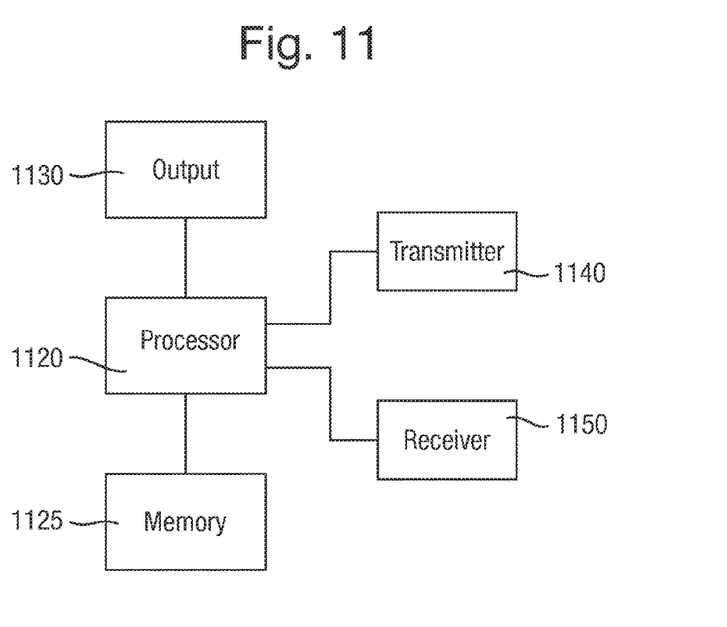
FIG. 11 illustrates an apparatus for receiving a live adaptive bitrate stream.

FIG. 11 illustrates an apparatus for receiving a live adaptive bitrate stream. The apparatus comprises a processor 1120 and a memory 1125, said memory containing instructions executable by said processor whereby said apparatus is operative to receive a manifest of segments of which the live adaptive bitrate stream is comprised. The apparatus is further operative to request at least one segment of the live adaptive bitrate stream, and subscribe to a push service associated with the manifest files for the live adaptive bitrate stream.

The apparatus of FIG. 11 further comprises an output 1130 for outputting content to a user. The output 1130 may comprise, for example, a screen, a speaker, a headphone socket, or an HDMI port. The apparatus further comprises a transmitter 1140 for sending information into a network, and a receiver 1150 for receiving information from a network. Transmitter 1140 and receiver 1150 may use either wired or wireless communication protocols.

Figure 12:
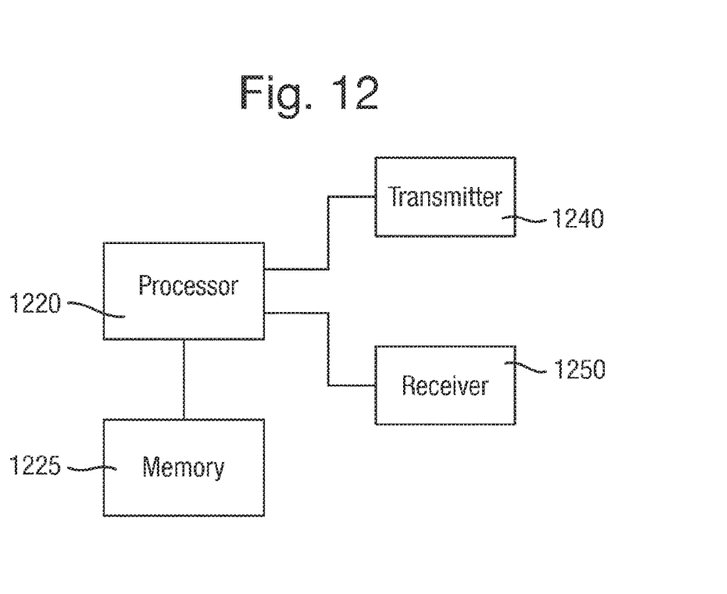
FIG. 12 illustrates an apparatus for delivering a live adaptive bitrate stream.

FIG. 12 illustrates an apparatus for delivering a live adaptive bitrate stream. The apparatus comprises a processor 1220 and a memory 1225, said memory containing instructions executable by said processor 1220 whereby said apparatus is operative to: deliver adaptive bitrate segments requested by at least one client device; and distribute a manifest file listing available adaptive bitrate segments. The apparatus is further operative to issue a pushed message to subscribing client devices when the manifest file is updated with newly available adaptive bitrate segments.

The apparatus of FIG. 12 further comprises a transmitter 1240 for sending information into a network, and a receiver 1250 for receiving information from a network. Transmitter 1240 and receiver 1250 may use either wired or wireless communication protocols.

There is further provided an apparatus for receiving a live adaptive bitrate stream comprising a processor and a memory, said memory containing instructions executable by said processor whereby said apparatus comprising: a module for receiving a manifest of segments of which the live adaptive bitrate stream is comprised; and a module for requesting at least one segment of the live adaptive bitrate stream. The apparatus further comprises a module for subscribing to a push service associated with the manifest files for the live adaptive bitrate stream.

There is further provided an apparatus for delivering a live adaptive bitrate stream comprising a processor and a memory, said memory containing instructions executable by said processor whereby said apparatus comprising: a module for delivering adaptive bitrate segments requested by at least one client device; and a module for distributing a manifest file listing available adaptive bitrate segments. The apparatus further comprises a module for issuing a pushed message to subscribing client devices when the manifest file is updated with newly available adaptive bitrate segments.

There is further provided a computer-readable medium, carrying instructions, which, when executed by computer logic, causes said computer logic to carry out any of the methods defined herein.

There is further provided a computer-readable storage medium, storing instructions, which, when executed by computer logic, causes said computer logic to carry out any of the methods defined herein. The computer program product may be in the form of a non-volatile memory or volatile memory, e.g. an EEPROM (Electrically Erasable Programmable Read-only Memory), a flash memory, a disk drive or a RAM (Random-access memory).

The live adaptive bitrate stream contains live content. Live content is content that is received at the streaming system shortly before being sent to clients, any delay resulting from the time taken to process incoming data into a form ready for live ABR streaming.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope The client device may be a user apparatus. The client device may be any kind of personal computer such as a television, a smart television, a set-top box, a games-console, a home-theatre personal computer, a tablet, a smartphone, a laptop, or even a desktop PC.

While examples have been given in the context of HTTP Adaptive Streaming, these examples are not intended to be the limit of streaming system to which the disclosed method and apparatus may be applied. The principles disclosed herein can be applied to any streaming system which uses a description file. For example, this method and apparatus may be applied to Apple™ HTTP Live Streaming, and Microsoft™ Smooth Streaming.

The invention claimed is:

1. A client device configured to receive a live adaptive bitrate stream, comprising:
    a processor; and
    a memory containing instructions executable by the processor whereby the client device is operative to request manifest updates for the live adaptive bitrate stream by sending individual push-service requests to a push server and receiving a manifest update responsive to each push-service request, and:
        include an updated time stamp in each push-service request, wherein the push server determines whether a currently available manifest update at the push server is new relative to the updated time stamp and, if the currently available manifest update is not new relative to the updated time stamp, the push server defers responding to the push-service request until a next manifest update becomes available at the push server; and
        defer sending a next push-service request until after receiving a response from the push server to a most recently sent push-service request.

2. The client device of claim 1, wherein an initial manifest provided to the client device indicates an address to use for sending the push-service requests.

3. The client device of claim 1, wherein the instructions cause the client device to set the updated time stamp included in each push-service request as a generation time indicated in a last-received manifest update, or as a then current time at the client device.

4. The client device of claim 1, wherein the response received from the push server in response to each push-service request includes a next-available manifest update that is newer than the updated time stamp included in each push-service request.

5. The client device of claim 1, wherein the response received from the push server in response to each push-service request indicates a then-available manifest update that is newer than the updated time stamp included in each push-service request, and wherein the client device is operative to respond to each response from the push server by requesting the then-available manifest update.

6. The client device of claim 1, wherein the live adaptive bitrate stream contains live content.

7. A method in a client device configured to receive a live adaptive bitrate stream from a server, the method comprising requesting manifest updates for the live adaptive bitrate stream by sending individual push-service requests to a push server and receiving a manifest update responsive to each push-service request, said requesting based on the client device:
    including an updated time stamp in each push-service request, wherein the push server determines whether a currently available manifest update at the push server is new relative to the updated time stamp and, if the currently available manifest update is not new relative to the updated time stamp, the push server defers responding to the push-service request until a next manifest update becomes available at the push server; and
    deferring sending a next push-service request until after receiving a response from the push server to a most recently sent push-service request.

\* \* \* \* \*